(12) United States Patent
Lee

(10) Patent No.: US 7,385,483 B2
(45) Date of Patent: Jun. 10, 2008

(54) TERMITE ACOUSTIC DETECTION

(75) Inventor: Peng Lee, Oxford, MS (US)

(73) Assignee: The University of Mississippi, University, MS (US)

( * ) Notice: Subject to any disclaimer, the term of this patent is extended or adjusted under 35 U.S.C. 154(b) by 38 days.

(21) Appl. No.: 11/641,498

(22) Filed: Dec. 19, 2006

(65) Prior Publication Data

US 2007/0096928 A1 May 3, 2007

Related U.S. Application Data

(62) Division of application No. 10/680,377, filed on Oct. 7, 2003, now Pat. No. 7,271,706.

(60) Provisional application No. 60/417,257, filed on Oct. 9, 2002.

(51) Int. Cl.
*G08B 3/10* (2006.01)
*A01M 1/20* (2006.01)

(52) U.S. Cl. .................. 340/384.2; 340/388.1; 340/566; 43/107; 43/132.1

(58) Field of Classification Search ............ 340/384.2, 340/388.1, 566; 43/107, 132.1; 250/493.1, 250/495.1, 504 H, 250, 316.1
See application file for complete search history.

(56) References Cited

U.S. PATENT DOCUMENTS 5,184,419 A * 2/1993 Tallon ..................... 43/132.1
5,285,688 A * 2/1994 Robbins et al. ............... 73/587
5,575,106 A * 11/1996 Martin et al. .............. 43/132.1
6,255,652 B1 * 7/2001 Moyer ........................ 250/343
6,313,643 B1 * 11/2001 Tirkel et al. ................ 324/642
6,801,131 B2 * 10/2004 Donskoy et al. ......... 340/573.1
6,883,375 B2 * 4/2005 Dunegan ..................... 73/587

* cited by examiner

*Primary Examiner*—Toan N Pham
(74) *Attorney, Agent, or Firm*—Susan B. Fentress; Baker, Donelson, Bearman, Caldwell & Berkowitz, PC

(57) ABSTRACT

A method and system for detecting the presence of subterranean termites, involving use of a thermal imaging camera to scan the structure before installation of an acoustic sensor in order to quickly locate potential areas of subterranean termite infestation, and an acoustic sensor in the form of an accelerometer or the disclosed innovative acoustic sensors having a bandwidth of at least 100 Hz to 15 kHz to detect noises made by the subterranean termites. Information collected by the acoustic sensor may be transmitted to a portable mini-computer (pocket PC) for confirmation and to a central operations center for inclusion in a comprehensive database of termite data and information. A method and system for detecting the presence of dry-wood termites concealed in a structure, involving use of a heat source to warm up the wooden structure of interest and then using a thermal imaging camera to scan the structure for suspicious dry-wood infestation, followed by the use of an acoustic sensor and pattern recognition software to more precisely and accurately locate potential area of dry-wood termite infestation. Additionally, structural damage can be evaluated by the methods discussed herein, including live trees. Additionally, the method can be used to manipulate termite infestation behavior.

13 Claims, 8 Drawing Sheets

TERMITE ACOUSTIC DETECTION

RELATED APPLICATIONS

This application is a divisional application of U.S. application Ser. No. 10/680,377 filed Oct. 7, 2003 Pat. No. 7,271,706, entitled Termite Acoustic Detection and a continuation-in-part and claims the benefit under 35 U.S.C. 119(e) of U.S. Provisional Application Ser. No.: 60/417,257 filed Oct. 9, 2002, hereby specifically incorporated by reference in its entirety

STATEMENT REGARDING FEDERALLY SPONSORED RESEARCH OR DEVELOPMENT

U.S. Department of Agriculture Award #58-6402-04-040

REFERENCE TO APPENDIX

The computer program listing appendix submitted on a compact disk is hereby incorporated by reference. Two duplicate copies of a single disk are included; The disk was originally made on Oct. 4, 2003.

FIELD OF THE INVENTION

This invention relates to insect detection and, more particulary, to methods, systems and devices for detecting and preventing termite damage.

DESCRIPTTION OF RELATED ART

Termites are extremly destructive to wood material. Termites attack and destroy wood almost everywhere in the world, with the exception of climate zones that experience hard freezing. There are close to fifty species of termites in the United States, the majority of losses to wood material being caused by subterranean species. All termites are social insects. They live in colonies that can number over one million individuals.

It is difficult to put a dollar amount estimate on termite damage. However, renowned termite scientist Dr. Nan Yao Su at the University of Florida has estimated that the total annual cost of termite control and damage repair for the United States alone was 11 billion in 1999.

Few homes are treated for termite detection/prevention during construction, although this is the best and most economical way to prevent termite attack. Untreated foundations make the house very susceptible to termite attack. It is often very difficult and costly to apply effective control measures after a building has become infested with termites.

It is rarely apparent from visual observation that a termite infestation is active and that wood damage is occurring. Typically, only about 30 percent of structural wood in a structure is visible for visual inspection. Even when visible wood is to be inspected, an inspector often has to rely on secondary signs of an infestation, such as moisture staining, the presence of foraging tubes and debris expelled from termite colonies.

Another method often used to detect termites is to tap the surface of the wood while listening for a characteristic sound indicative of an underlying gallery void. When a suspected area is located, the inspector applies a sharp probe, such as a screwdriver, to break the wood surface and locate wood galleries and live termites. This method has significant disadvantages. The confirmation of an active infestation requires some localized damage to the wood. Also, when termites are exposed in this manner, the destruction induces termites to retreat from the disturbed area and may reduce the effectiveness of a subsequent localized treatment.

Commercial demand for a dependable, nondestructive and nonsubjective method to detect termites has spawned a number of alternatives to visual inspection. However, none of these techniques has satisfied the non-destructive and non-subjective requirements, and many infestations are still missed.

Prior devices for nondestructive detection of termites may be generally classified into four categories:

(1) Apparatus having sensors that detect the presence of gases emitted by termites, as disclosed for example in U.S. Pat. No. 6,150,944;

(2) Apparatus having acoustic sensors that detect insect sounds at high or ultrasonic frequencies, as disclosed for example in U.S. Pat. No. 4,809,554 to Shade et al., U.S. Pat. No. 5,285,688 to Robbins et al., and Japanese Patent Application JP H07-143837;

(3) Apparatus having sensors that detect destruction of a baited sample, for example, inclusion of circuit elements designed to be destroyed as the sample is destroyed, thereby breaking a circuit, as disclosed in U.S. Pat. Nos. 6,052,066; 5,815,090; 5,592,774; activation of a switch by movement of a mechanical element in response to sample destruction, as disclosed in U.S. Pat. No. 5,571,967 and Japanese Patent Publication No. H7-255344; or penetration of a film across the entrance to a baited trap, as disclosed in U.S. Pat. No. 5,877,422; and (4) Apparatus employing infrared sensors.

Detection devices that rely on sensing the presence of termite-created gases eliminate the need to use bait to attract the termites, and, in theory, they can signal the actual locations of the termites. A significant disadvantage, however, is that the gases must be abstracted within a confined space, such as within the walls of a structure. These devices are thus unsuitable for detecting termites in wood that is not within a confined space. Moreover, the use of these devices to detect termites is very time-consuming and costly as a result.

Detection devises that rely on sensing ultrasonic termite sounds, on the other hand, offer the advantage that they can be placed on the exterior of structural walls rather than within the walls. The ultrasonic frequencies, however, are difficult to detect through walls and other concealing structures due to the signal's very short distance of travel (ultrasonic frequencies have very high transmission loss), and this process fails to take into account the full range of termites noises, which fall primarily in the range of 100 Hz to 15 kHz.

An alternative to devices employing ultrasonic acoustic sensors is a device employing sensor (or electronic stethoscope) arranged to detect acoustic signals and process them for listening and directs interpretation by a trained operator. In some cases, the device may be connected to a spectrum analyzer arranged to generate a plot of signals in the frequency domain, which can then be interpreted by the operator. These devices require a high degree of operator skill. In addition, such devices typically use a relatively narrow frequency range. For example, the device disclosed in U.S. Pat. No. 4,895,025 is focused on a frequency range of 1462.5 Hz to 3337.5 Hz. The device of U.S. Pat. No. 4,941,356 (the '356 patent), on the other hand, is evidently intended to work over a broad range of audible frequencies (100 Hz to 15 kHz). The '356 patent, however, fails to disclose specific apparatus, algorithms or noise patterns useful for detection over the specified frequency range.

The various devices for sensing the destruction of bait sample are useful for detecting the presence of termites in the vicinity of a structure, but cannot be used to locate precise areas of termite infestation in concealed areas within the structure. Once it has been determined that termites are present in the vicinity of the structure, the only way to determine the actual locations of termites within the structure is to remove portions of the structure, which is, again, damaging and costly.

It has also been proposed to use infrared sensors to detect the surface temperature differences indicative of termite infestations. Infrared detection works because subterranean termites require a high percentage of humidity in their living environment. Moisture brought in by the termites produce a temperature change in the wall, which can be detected by an infrared thermal imaging device. However, this is a relatively nonspecific method, yielding many, many false positives since there are many sources of temperature differences in a typical structure, such as non-uniform insulation material, air-conditioning ducts, leakage, air movement through wall cracks, water and moisture problems, etc. As a result, detection of termites using infrared sensors still requires destruction of walls to verify results and to more specifically locate the actual termite infestations. Furthermore, use of infrared sensing for detection of termites also requires a relatively high degree of operator skill, training and judgment which adds time and cost to its use.

Devices relying on acoustic detection appear to offer the best combination of accuracy and lack of destruction. Such devices, however, generally do not take into account the full range of termite sounds, as explained above. Moreover, the design of prior devices has generally resulted in only highly localized detection ability, thereby necessitating the taking of many samples or data points, and requiring an inordinate amount of time or number of sensors to completely inspect a structure.

As a result of the various practical difficulties outlined above, the prior devices described above have generally seen insignificant commercial implementation despite the long-felt need for nondestructive termite and wood-destroying insect detection. There is still a need for a nondestructive, reliable and easy-to-use apparatus and method for detecting wood destroying insects.

SUMMARY OF THE INVENTION

The present invention is an apparatus, system and method for reliably, rapidly and easily detecting the presence of termites and other wood destroying insects by nondestructive means. The present invention includes apparatus for detecting insect sounds over the full range of frequencies from about 100 Hz to about 15 kHz. The apparatus is capable of comparing the detected sounds to a library of previously recorded known termite sounds, using pattern matching or recognition to find matches. The apparatus is also capable of generating and transmitting detection messages to an operator based on the results of the comparison.

The apparatus may include an acoustic sensor, specially optimized for detecting termite sounds in the 100 Hz to 15 kHz frequency range while excluding the effect of ambient noise. The sensor generally includes a highly sensitive electronic microphone coupled with a mechanical sound amplification means, such as a stethoscope. The mechanical amplifier provides the microphone with a signal having a high signal-to-noise ratio. The microphone then converts the high-quality sound signal to an electronic signal, which can then be used for automated comparison. The sensor may be filled or surrounded by a sound attenuating substance or element for minimizing or eliminating the effect of airborne ambient sounds.

The invention may further include an acoustic pattern recognition system including a prerecorded library of termite activity sounds for various species of termites. This library serves as a reference of database which may be compared with the newly detected and potential termite activity sounds by a processor included with the apparatus of the present invention. When the comparison achieves a certain predetermined threshold of similarity, the processor generates a "Termite Detected" message, which may be transmitted to the operator. Otherwise a "No Termite Detected" message is generated and transmitted. The acoustic pattern recognition system of the present invention not only can be used to detect and identify termite infestation but also can be used to detect and identify other insect infestations by simply replacing the termite database library with other appropriate insect database libraries of interest.

The acoustic detection method and system of the present invention may also be combined with an infrared detection system. Infrared detection has the advantage of covering a much larger area than acoustic detection and, although less specific or accurate than acoustic detection, provides efficient screening and a convenient way of scanning the structure for potential infestations in order to guide placement of acoustic sensors in order to carry out more specific test with the acoustic sensors. In this way, inspection time requirements, and, therefore, costs, are greatly reduced. Further, detection accuracy is greatly increased. The combination of infrared and acoustic inspection couples a quicker but low-specificity screening technique for speed with a high-specificity, slower technique for accuracy and is a significant improvement in the art having important commercial applications.

This invention provides a method to detect wood destroying insect infestation sites in a structure by performing a thermal scan of the structure to identify potential infestation sites; positioning acoustic sensors at the potential infestation sites to detect vibration signals between 100 hertz and 15 kilohertz; transmitting detected vibration signals to a computing device for comparing the detected vibration signals with control signals; and detecting wood destroying insect infestation if detected signals are substantially similar to the control signals.

Additionally, this invention provides a system to detect wood destroying insect infestation in a structure made of means to perform a thermal scan of a structure to locate potential infestation sites; a means to acoustically detect termite activity sounds at potential infestation sites; a means to compare detected termite activity sound, with a library of prerecorded termite activity sounds; and a means to determine if detected termite activity sounds are substantially similar to prerecorded termite activity sounds.

This technique is very effective in detecting both subterranean termites and dry-wood termites. When a subterranean termite invades a structure, it brings in a substantial amount of moisture to the infested area. As the water (moisture) evaporates, the infested area becomes cooler, and the difference in temperature can easily be detected by the thermal imaging camera, thus identifying a "suspicious area" of possible subterranean termite activity. However, as its name implies, the dry-wood termite does not bring in moisture to the infested area. But dry-wood termites can still be detected by thermal imaging. Dry-wood termites create a larger cavity in the infested wood object as compared to subterranean termites. These large cavities are often carved out just beneath the wood object's surface, without exhibiting any signs of damage to the surface itself. Therefore, it is extremely difficult to locate these large cavities carved out by dry-wood termites. However, with the aid of a heat source these cavities can be detected by thermal imaging. The procedure involves exposing the targeted wood object to a heat source, such as an electric, gas or kerosene heater, an infrared light source or any other kind of heat source. The wood surface above the dry-wood termite gallery cavity will possess a much lower heat capacity as compared to the surrounding solid (cavity-free) wood. As a result, the surface temperature above the cavity where the infestation is occurring will reach a higher temperature quicker than the surface temperature of the surrounding solid wood. This temperature difference can be easily picked up by a thermal imaging camera and identified as a "suspicious area."

One implementation of the invention is a method involving the placement of acoustical sensors on walls and other exposed portions of a structure, such as roof trusses. Signals from the sensors are communicated to a centrally located computing device including a processor. The processor analyzes the signals, preferably in the time domain, for patterns characteristic of termites or other wood-eating insects. Upon detecting the presence of termites, the controller can then generate certain kind of acoustics vibrations to repel the termites.

According to yet another aspect of the invention, the sounds and location data taken at each inspection site using the above-summarized methods and apparatus, as well as data provided by other available sources, may be provided to a central operations unit for use in building a central database of termite information. The central operations unit may operate on a nationwide or even worldwide basis and serves as a facility of data communications, data acquisition, maintenance of sound libraries, continuous updating of sound library references, aggregation of recognition results and aggregation of inspection results. The accumulated data may be made available to entities interested in termite presence, behavior, movements and trends or in termite infestation and damage to structures, for access by structure, species or geography, thereby providing an invaluable termite information resource.

It is, accordingly, a first advantage of the invention that a nondestructive and yet reliable method and apparatus for accurately detecting the presence of termites very quickly is provided.

It is a second advantage of the invention that a termite detection method that utilizes nondestructive acoustic detection, that is carried out in the full termite noise frequency range of 100 Hz to 15 KHz, and that does not require on-site monitoring or interpretation of the acoustic detection results by a human operator is provided.

It is a third advantage of the invention that a termite detection method that utilizes nondestructive acoustic detection and yet that minimizes the number of acoustic sensors, sample sites and time required to inspect a structure is provided.

It is a fourth advantage of the invention that a central database of termite information, made available to appropriate entries and individuals, is provided.

The acoustic detection system of the present invention enables the detection of termite infestation in buildings and trees accurately and as early as possible. Early and accurate detection of an infestation reduces damage and the resultant amount of insecticide use required to stop it. By using acoustic detection, little to no damage to buildings or trees occurs during the inspection process, therefore reducing the amount of money spent by the homeowner on repair work as well as reducing the risk of a lawsuit by the homeowner.

This invention further relates to the use of a laser doppler vibrometer to detect vibration of an unexcited wall, tree or other concealing structure. In particular, this invention involves use of a laser Doppler vibrometer to detect acoustic patterns following acoustic excitation of the structure being evaluated, using apparatus and techniques similar to those described in detail in U.S. Pat. No. 6,081,481, herein incorporated by reference.

A still further aspect of the preferred embodiment of the invention is modification of the behavior of detected termites using acoustic signals. The goal of such behavior modifications is to either repel the termites, induce them to enter a trap where they can be destroyed, or otherwise cause the termites to behave in a self-destructive manner.

Finally, according to yet another aspect of the preferred embodiment of the invention, the sounds and location data taken at each inspection site using the above-summarized methods and apparatus, as well as data provided by other available sources, may be provided to a central operations unit for use in building a central database of termite information. The central operations unit may operate on a nationwide or even worldwide basis, and serves as a facility of data communications, data acquisition, data analysis, maintenance of sound libraries, continuous updating of sound library references, aggregation of recognition results, and aggregation of inspection results. The accumulated data may be made available to entities interested in termite presence, behavior, movements, and trends, or in termite infestation and damage to structures, for access by structure, species, or geography, thereby providing an invaluable termite information resource. No such centralized resource is currently available.

DETAILED DESCRIPTION OF THE PREFERRED EMBODIMENTS

Figure 1:
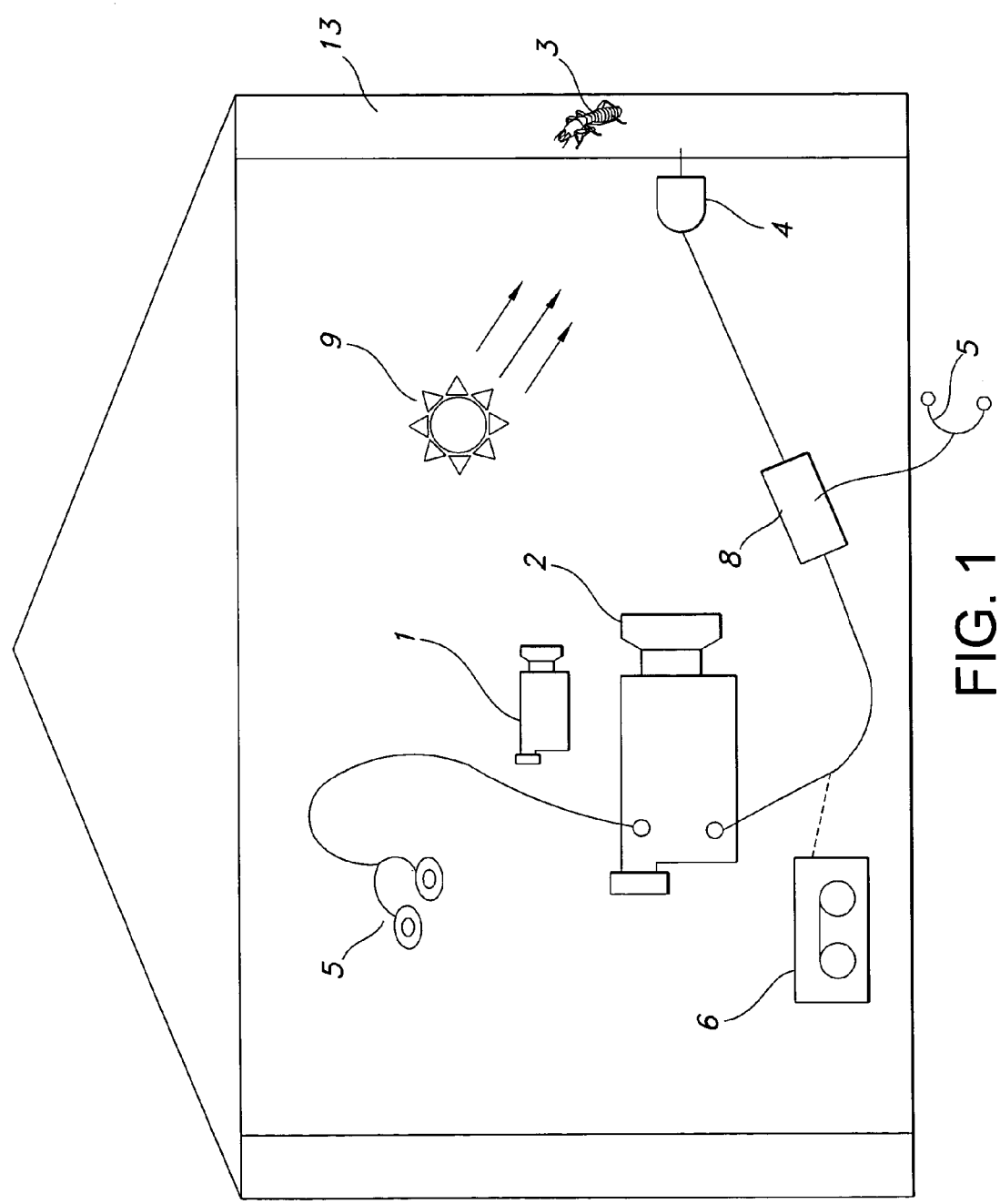
FIG. 1 is a schematic illustration of a termite detection system assembled in accordance with the principles of a preferred embodiment of the invention.

As schematically depicted in FIG. 1, a preferred embodiment of the apparatus and method of the present invention includes a thermal imaging camera 1 for performing a preliminary scan of a structure 13 in order to locate potential termite infestations sites 3. The structure 13 can be a wooden object, such as a wall stud, paneling or in one embodiment a live tree. Termite infestation sites 3 can be the result of subterranean termite or dry-wood termite activity. In the case of a subterranean termite infestation, the moisture brought in by the subterranean termites will show up as a "suspicious cold or hot spot" in a thermal imaging scan. In the case of a dry-wood termite infestation, a heat or cold source 9 is needed to increase or decrease the temperature of a targeted structure 13. This heat source 9 can be an electric, gas or oil heat source as well as an incandescent or infrared light source. The areas in the targeted structure 13 that contain a cavity created by dry-wood termites will show up as "suspicious warm or hot spots." The correspondent video images of the potential termite infestation are recorded by the camcorder 2 or by the thermal imaging camera if it is equipped with recording capability 6.

Upon a preliminary thermal indication of termite infestation observed with thermal imaging camera 1, acoustic sensors 4 are positioned on the wall of the structure adjacent to the potentially infested locations in the structure 13. The outputs of sensors 4 are passed through controller 8, which includes a low-noise amplifier and a band-pass filter arranged to exclude background noise and vibration signals below 100 hertz, and high frequency noise above 15 kilohertz and recorded by camcorder 2 or other audio recording device 6. A headphone 5 can be used to detect sounds and to facilitate the placement of the sensors 4. The recorded audio information is then provided as an input to computing device 10, depicted in FIG. 2, for analysis of the detected noises. The computing device 10 in FIG. 2, which is typically centrally located but may also be portable, is operably connected with a database library (control signals) 11 of termite sounds for comparison with the detected vibration signals, as further described herein below. The wood destroying insect infestation sites 3 is detected if the detected vibration signals are substantially similar to the control signal.

Thermal imaging camera 1 may be any of a number known, commercially available infrared cameras conventionally used by structural engineers, police and the military. In order to improve the accuracy by which the thermal imaging camera 1 detects potential areas of termite infestation, the thermal imaging camera may further include wood destroying insect infestation recognition software, such as matched filtering software which compares the frequency spectrum of a thermal image with frequency spectra of a reference images known to indicate termite infestation, thereby reducing the level of skill required of the camera operator, reducing time required and increasing termite identification effectiveness. This database of infestation images of suspicious thermal images can be built by one skilled in the art.

Controller 8 includes a low-noise amplifier and a band pass filter. The band pass filter preferably has a pass band, for most species of termites, of from between 100 Hz to about 15 kHz. Controller 8 may be a separate unit or may be included, in whole or in part, in the acoustic sensors.

Database library 11 is made up of a compilation of numerous termite sound recordings in different settings, substrates and conditions, collected and catalogued over a period of time. The system and apparatus of FIG. 1 may be used to capture and compile recordings of termite noises in one setting that can be used as controls for comparison with actual detected noise patterns. The controls included in database library 11 may include sounds from different species of termites in varied environments and under varying conditions to account for the expected degree of variation in termite sounds that may be encountered based on these variables.

A processor in computing device 10 compares the recorded signals from controller 8 with the signal patterns stored in database library 11. When the comparison achieves a certain predetermined threshold of similarity, a "Termite Detected" message will be generated and transmitted to the operator; otherwise, a "No Termite Detected" message will be generated and transmitted to the operator.

Due to advanced computing technology the above operation can also be easily performed by a mini PC which can be easily attached or built into the controller 8.

It will be appreciated by those skilled in the art that the acoustic pattern recognition system not only can be used to detect and identify termite infestations but can also be used to detect and identify other insect infestations by replacing or supplementing the database library 11 with sounds recorded from other insect infestations.

Figure 3:
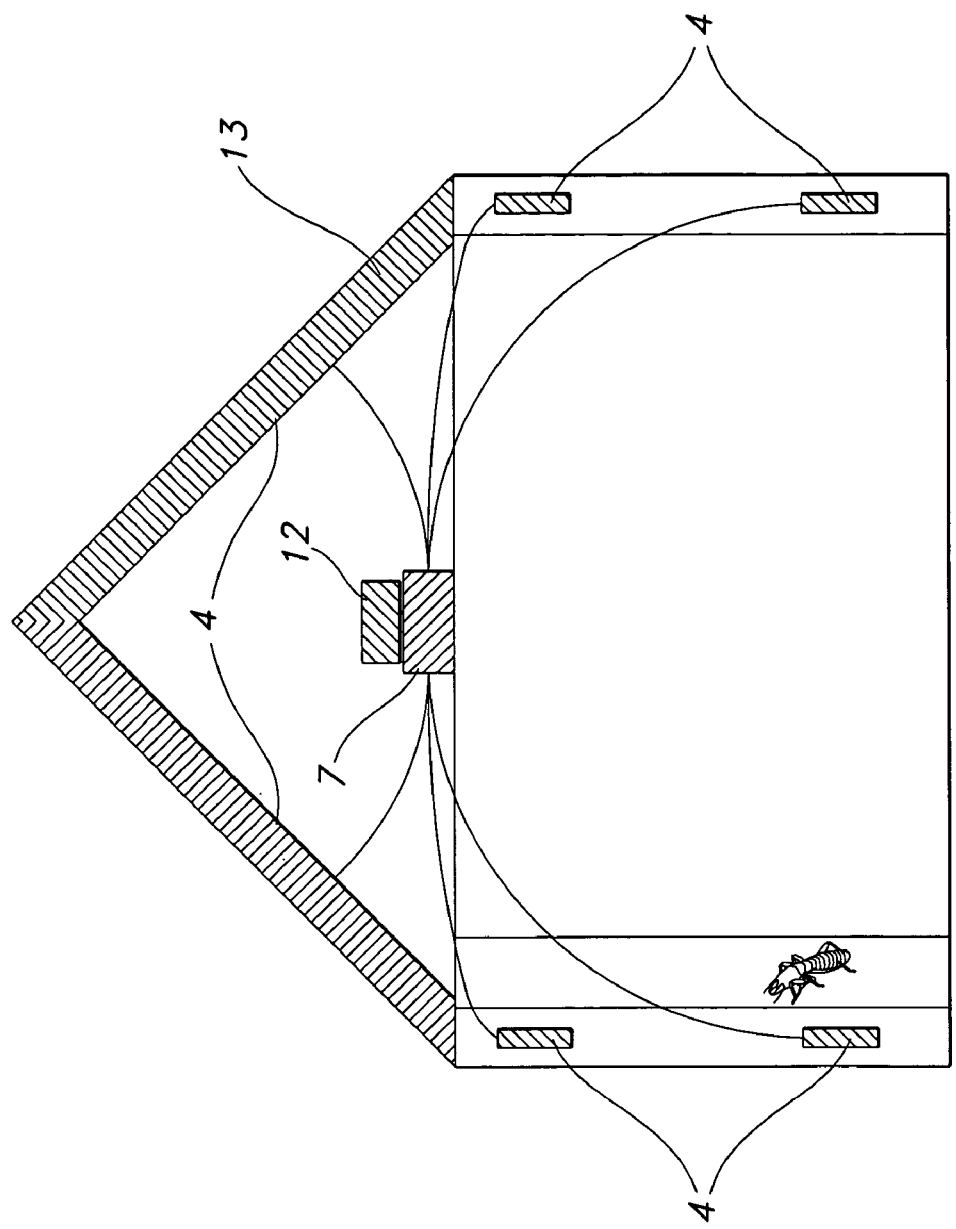
FIG. 3 is a schematic illustration of a combination of multiple acoustic sensors and pattern recognition processor deployed in a structure.

The acoustic pattern recognition method described above may be used to protect, through early detection, buildings or any other wood structures from termite invasions even before any signs of termite infestation are visible through use of the thermal imaging camera 1 and acoustic sensors 4. (The term "structures" is intended to encompass natural as well as manmade victims of termite infestation, including trees.) As schematically depicted in FIG. 3, this protection is achieved by permanently deploying an array of acoustic sensors 4 on all major building structures 13 such as trusses, studs and joists, and by connecting the sensors to a central controller 8. Signals picked up by any sensor 4 are passed through an electronic circuit in central controller 8, which includes a low-noise amplifier and a band-pass filter arranged to exclude background noise and vibration signals below 100 hertz, and high frequency noise above 15 kilohertz. The processed signals are then converted into digital signals for processing by a processor 12 contained within central controller 8. The processor compares the signals with the pre-recorded data from insect database library 11, to which central controller 8 is electrically operably coupled. When the comparison achieves a certain pre-determined threshold of similarity, a "termite invasion" warning signal may be generated and issued to the home or building owner or to a contract security monitoring system, or simply generate acoustic vibration signal on the structure to repel invading termite. Acoustic vibration signal can be generated by small transducers (commercially available) that are permanently attached to building structure such as trusses, studs, and joists.

While the present invention is not limited to a particular pattern-matching algorithm, there are various techniques that are capable of identifying an insect acoustic signal and that are suitable for use with the present invention. For example, a cross-correlation algorithm, although not the fastest algorithm available, has shown good consistency and accuracy. Cross-correlation works best when the insect signal is louder than the background noise. Of course, as will be appreciated by those skilled in the art, any other suitable technique may be used to extract acoustic signals that are embedded in the background noise level.

The acoustic sensor 4 employs a sensitive microphone 40, which is embedded in a stethoscope 46. The output electrical signal from microphone 40 is sent through coaxial cable 41, which is electrically coupled to controller 8. Stethoscope 46 is employed because its mechanical amplification characteristic produces a very high signal-to-noise ratio output.

The illustrated embodiment of sensor 4 includes a long (6" to 12") small diameter (10 to 16 gauge) spike 44. Proximal end 62 of spike 44 is in intimate and integral contact with the stethoscope diaphragm 42. Distal end 64 of spike 44 may be used as a probe that can be inserted into potential infestation areas such as walls, wood members, cracks, base boards, trees, etc. It is critical that spike 44 be flexibly but firmly connected at connection 43 to rigid face plate 45 of the sensor unit 6 so that sound vibrations in spike 44 are not attenuated by face plate 45, but also so that spike 44 has the required degree of rigidity for insertion into hard material. Connection 43 may be made by riveting or by any other similar method of connection that provides a firm connection and yet does not integrally connect spike 44 with face plate 45 and allows for a small degree of relative movement between the two structures. This will ensure that most of the structure-borne signals will transmit through spike 44 to stethoscope diaphragm 42 and yet spike 44 will have enough mechanical support strength from the faceplate to allow insertion into wooden objects.

Stethoscope 46 serves to mechanically amplify the signal, which primarily includes termite structure-borne signals, transmitted from spike 44 to diaphragm 42. The sounds detected by spike 44 and diaphragm 42, then amplified by stethoscope 46, are converted by microphone 40 into an electrical signal that is transmitted through coaxial cable 41 to the controller 8. Alternatively, other transmission media may be used, such as light transmitted over optical fiber. Face plate 45 and sensor housing cap 48 are sealingly attached at periphery 49 or secured by a treaded ring to housing cap 48 periphery (treaded) 49. The bulk of airborne background noise that might interfere with termite detection accuracy is eliminated by this sealed housing. Further, housing cap 48 and face plate 45 together serve to form a sealed, protective enclosure for the internal sensor components. Face plate 45 may be made of metal, preferably mild steel, and about 26-28 gauge thickness. Housing cap 48 may be of metal about the thickness of face plate 45 or of thicker plastic. Space 47 between stethoscope 46 and cap 48 may be filled with a noise-attenuating medium such as modeling clay, acoustic absorbing material, etc.

Figure 4:
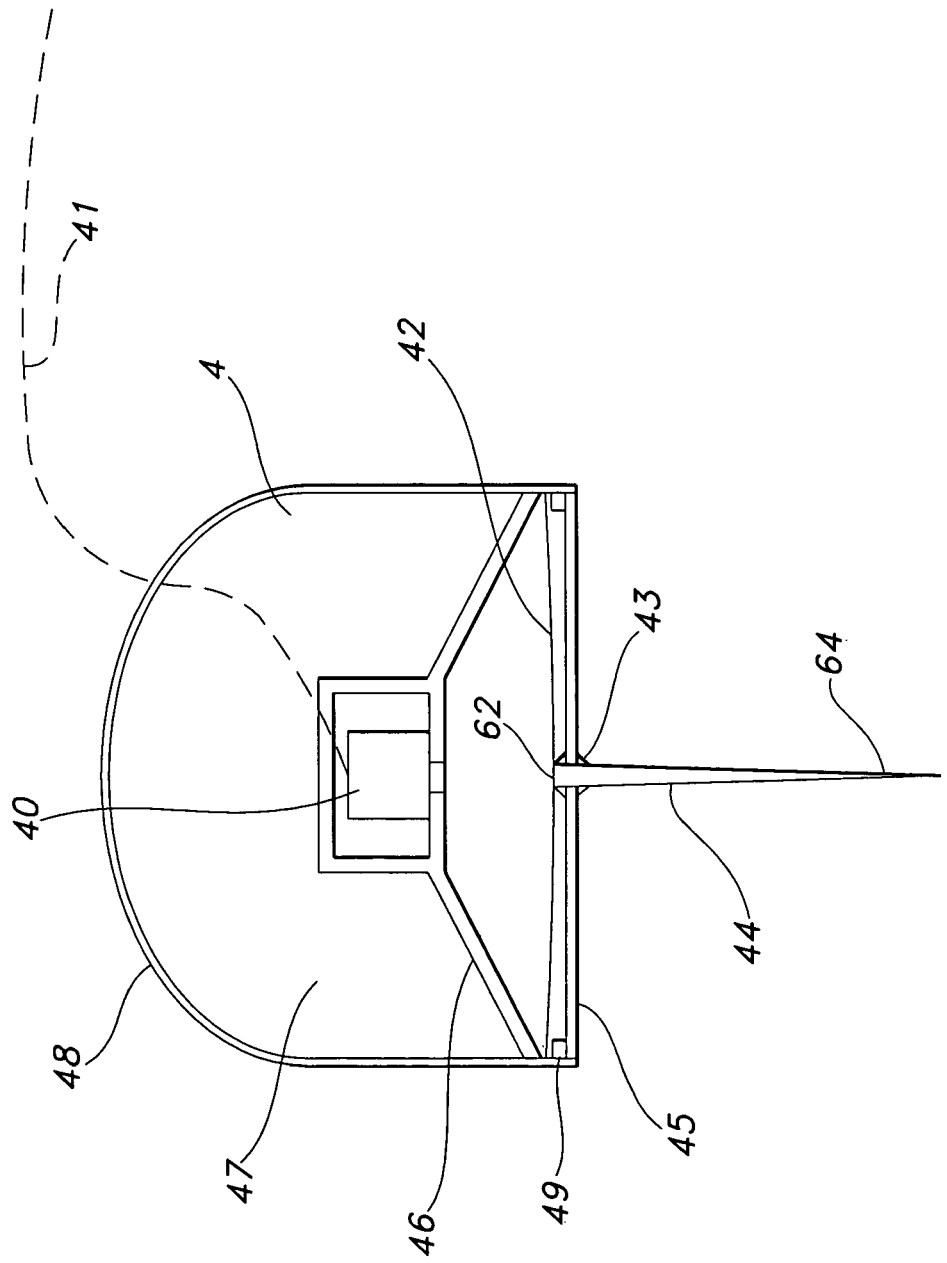
FIG. 4 is a schematic depiction of an improved acoustic sensor according to the present invention.
Figure 5:
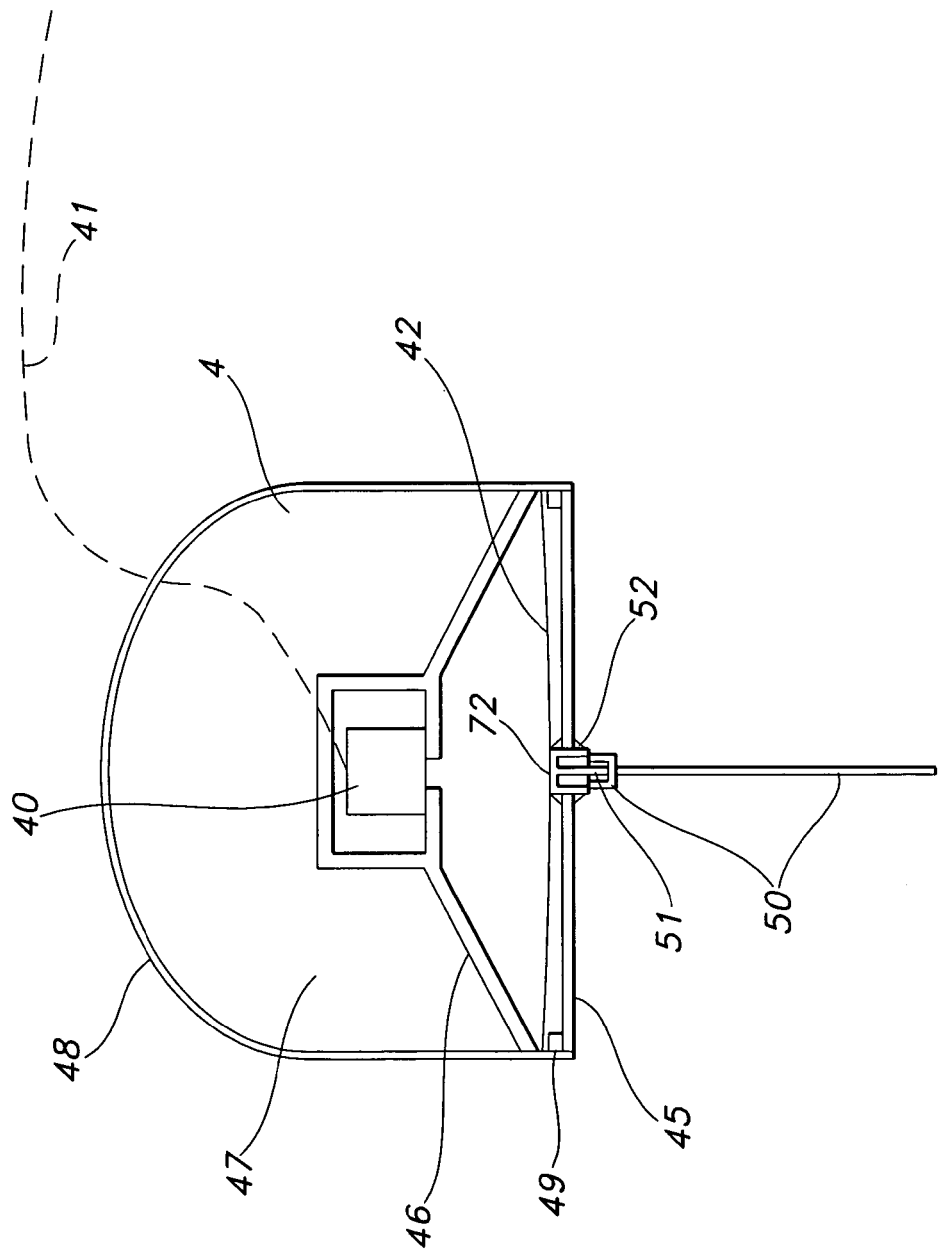
FIG. 5 is a schematic depiction of another embodiment of an improved acoustic sensor according to the present invention.

FIG. 5 depicts another embodiment of acoustic sensor 4. While similar to the sensor depicted in FIG. 4, spike 44 has been replaced with a smaller diameter variable length disposable probe 50, similar to a disposable hypodermic needle. The disposable probe 50 can be easily connected to a receptacle connector 51, which may be a "Lauer lock" connector. The probe 50 and receptacle connector 51 are tightly secured to face plate 45, preferably by strong glue at connection 52, so as to ensure that probe 50 is firmly supported while the proximal end 72 maintains intimate integral contact with diaphragm 42. Through this arrangement, probe 50 and receptacle connector 51 function as a "fixed" probe that can transmit most of the structure-borne termite signals to the stethoscope diaphragm.

As an alternative to the embodiments described above wherein an acoustical sensor is used to sense termite sounds, termite sound vibration may also be detected by other vibration sensing means. Such means may include, for example, an accelerometer.

Figure 2:
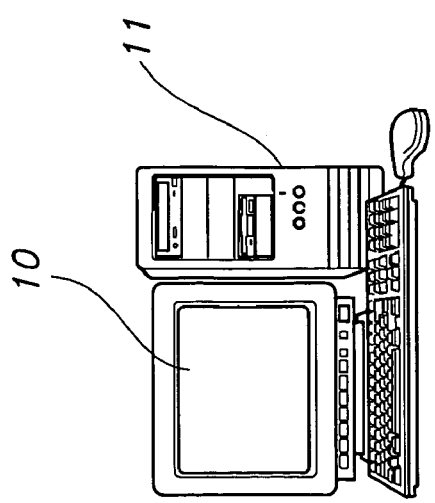
FIG. 2 is a schematic illustration of a central computer with a termite activities sounds database library.

According to an especially advantageous aspect of the preferred embodiment of the invention, computing device 10 as depicted in FIG. 2 may be part of or can be interconnected to a nationwide or even worldwide operations center that may serve as a facility for data communications, data acquisition and data analysis. Database library 11 may be maintained at this centralized location and may be continuously updated based on recorded sounds received from a wide variety of locations and under a wide variety of conditions. The centralized nature of compilation enables aggregation of recognition results and aggregation of inspection results. The resulting database or databases 11 may include the above-mentioned libraries of termite sound and/or response data as well as other types of termite data or information, for use by any individuals or entities interested in termite presence, behavior, movements and trends, as well as those specifically concerned with termite infestation and damage to structures. Access to the database may be by structure, species or geography or any other appropriate category or classification. Portable computer units could contain databases that receive periodic updates to provide instant feedback while maintaining mobility.

Figure 6:
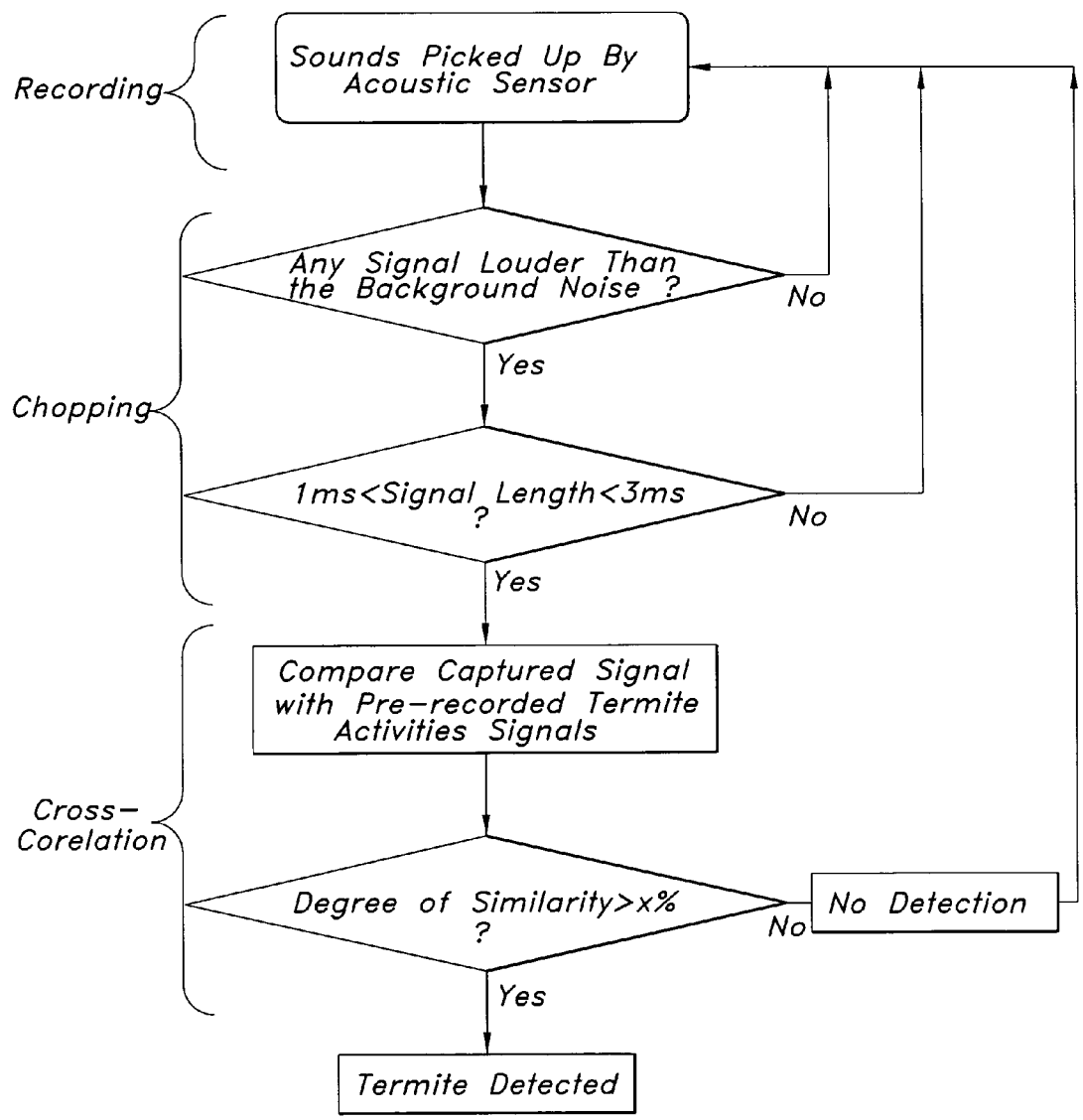
FIG. 6 is a flow chart depiction of the pattern recognition software algorithm.

As depicted in FIG. 6 flow chart of the pattern recognition process, the process has three stages. In the Recording stage, suspicious sounds are detected by the acoustic sensor and fed into the computer, where the sounds are then recorded by the pattern recognition software. After the sounds have been detected and recorded, the Chopping stage begins wherein the pattern recognition software measures the incoming acoustic signals and compares them to signals determined to be background noise. If the detected signal is determined to be louder than the background noise level, the software then ascertains the signal's length. If the signal is determined to have a length between 0.5 millisecond and three milliseconds (which is unique characteristics of termite activity sound), the signal is then passed along to the Cross-Correlation stage. In the Cross-Correlation stage, the software compares the detected signal to prerecorded termite activities signals contained in the database library 11. A certain degree of similarity indicates that the detected signal matches a pre-recorded signal or signals found in the database library, and it is determined that a termite has been detected. If an insufficient degree of similarity is found between the detected signal and prerecorded signals in the database library, the software determines that no termite has been detected. A sample of this type of software is set out in appendix A (hereby incorporated by reference). This software is contained in duplicate copies of compact disks 1 and 2 referred to in the "Reference to Appendix" which contain the files listed in the table below.

| Name | Size (KB) | Date Created |
| --- | --- | --- |
| Newres.h.txt | 1 | Mar. 22, 2004 |
| Resource.h.txt | 1 | Mar. 22, 2004 |
| Winaudio2.c.txt | 5 | Mar. 22, 2004 |
| Winaudio2.h.txt | 1 | Mar. 22, 2004 |
| WinCorr32PktPC.cpp.txt | 18 | Mar. 22, 2004 |
| WinCorr32PktPC.rc.txt | 2 | Mar. 22, 2004 |

Termite Detection Pattern Recognition Algorithm

Figure 7:
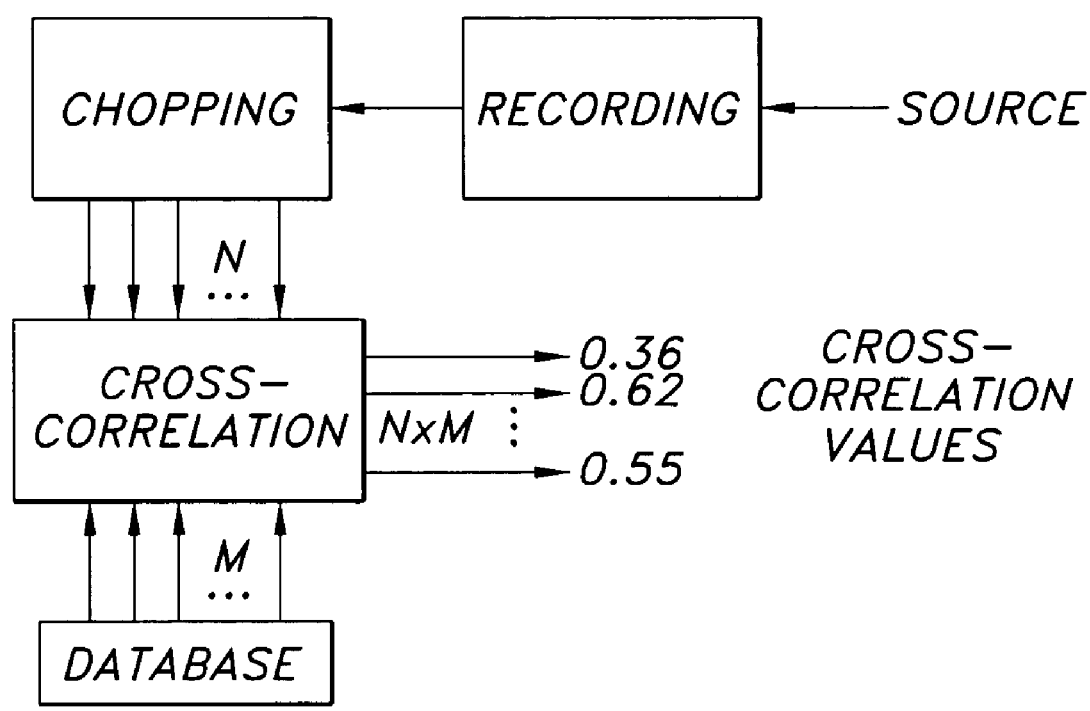
FIG. 7 is a schematic illustration of the termite detection process.

The termite detection algorithm consists of three main tasks: Recording; Chopping; and Cross-correlation, as set out in FIGS. 6-7.

These tasks take place sequentially in the order above once the user clicks the "Detect" button of the operational pop-up menu as seen on the mini-computer in order to activate the pattern recognition software.

The tasks execute independently from one another, but the input at stage "i" depends on the output of the previous stage "i-1". The Chopping stage depends on the Recording stage. The Cross-correlation stage is really independent of the Chopping stage, but detection accuracy improves when Chopping is performed before Cross-correlation.

The detection process is depicted above, and can be summarized as follows:

(a) The Recording stage captures an audio signal from an external source (suspicious termite sound source 3) by an acoustic sensor.

(b) The Chopping stage receives the recorded signal as input and produces N numbers of chopped signals.

(c) The Cross-correlation stage receives the N chopped signals plus M additional audio signals previously stored in a database (prerecorded termite signal). From these signals N×M cross-correlation values are calculated.

(d) The cross-correlation values are non-dimensional real numbers that give a good estimation of how close the N signals taken from the external source "match" the signals stored in the database (perfect mach will produce a value of 1).

Recording (e) In the Recording stage, an audio signal is recorded from the suspicious source, converted and stored in digital form to the computer.

The signal is acquired at a rate (sampling rate) of 44.1 KHz (44,100 points per second) or higher, with a resolution of 16 bits or higher through a single channel. In the current implementation the signal is recorded for five seconds (can be shorter or longer), after which Recording ends and the next stage Chopping starts. On the Windows desktop platform, recording is implemented using the MMIO (Multimedia I/O interface). On the Pocket PC platform, it is implemented by reusing the embedded Voice Recorder Control, with the AGC (Automatic Gain Control) turned off.

In the chopping stage, the recorded signal is processed and cut in smaller chunks; N shorter signals are created, or fewer, depending on the original signal. The chopping process works as follows. First, the noise floor level of the input signal is calculated. This is done by averaging the maximums of the signal and multiplying the result by a correction factor. Second, the input signal is scanned until the first maximum that exceeds the noise threshold is found. All samples scanned before the first maximum is discarded. Third, the signal is further scanned until the next maximum below the noise threshold is found. If the duration is between 0.5 to three milliseconds apart from the first maximum, the signal is chopped and captured as potential termite sound. Otherwise, the samples are discarded. This follows from the fact that termite sounds have very short duration, longer signals have little chance of belonging to termite sound sources. The process continues until the whole recorded signal is consumed.

In the cross-correlation stage, the N individual signals received from the chopping stage are "cross-correlated" with M fixed signals from the previously recorded known termite sound application database. This internal database is called the "termite database". The cross-correlation between two signals A and B provide a measure of how close signal A matches the shape of signal B. With this in mind the process works as follows. First, the chopped signals are cross-correlated one by one with each signal from the termite database. Second, the cross-correlation value is compared against a cross-correlation threshold. If the calculated value exceeds the predefined threshold, a match occurs indicating detection. The process stops. Third, if the calculated value is below the cross-correlation threshold, the chopped signal is discarded. The process continues until all chopped signals are cross-correlated with the database signals or until a successful match occurs, whichever comes first.

Figure 8:
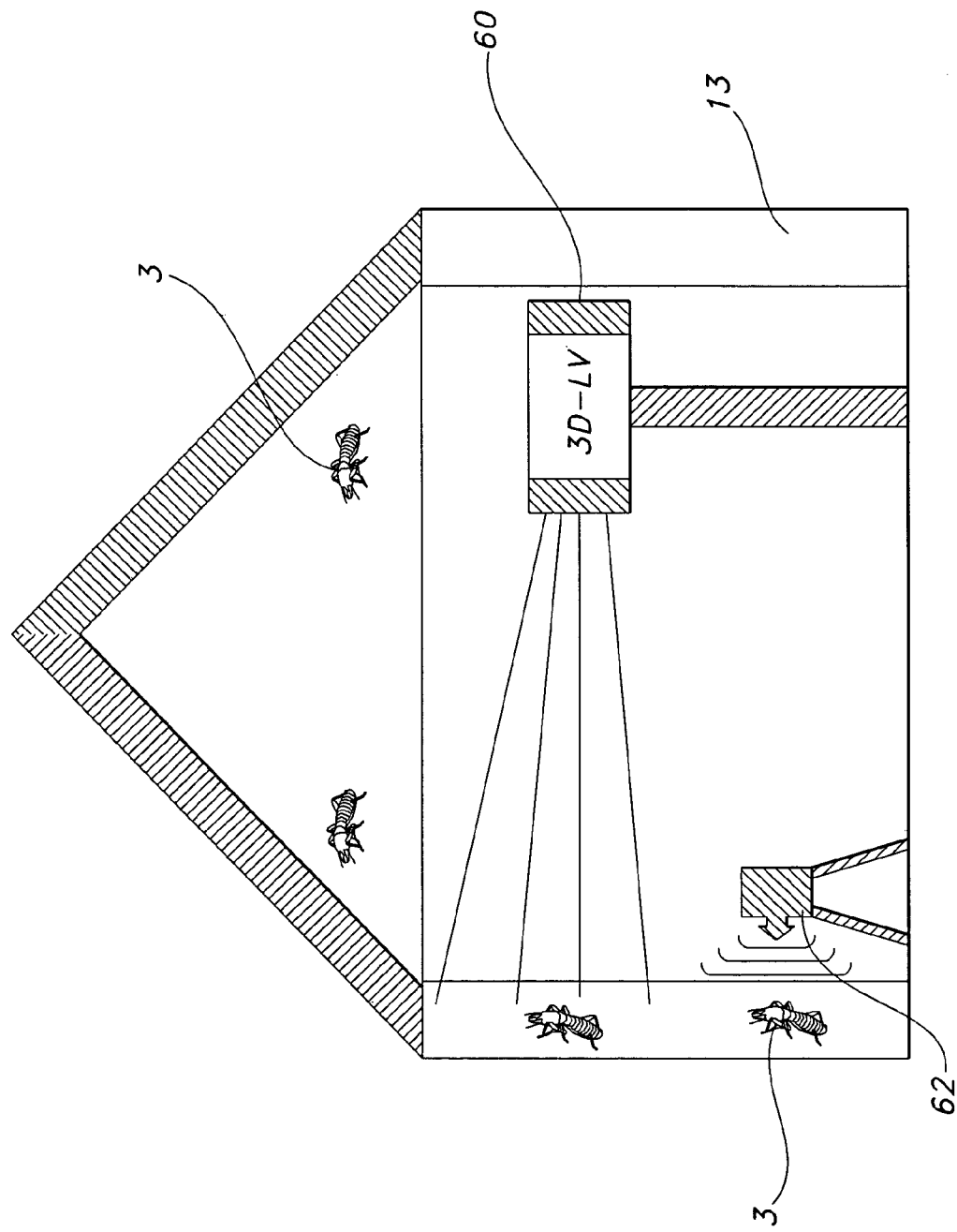
FIG. 8 is a schematic illustration of a structural integrity evaluation method diagram of a system for nondestructively evaluating structural damage in accordance with the principle of this invention.

In another aspect of this invention shown in FIG. 8, a method for evaluating potentially damaged concealed in a structure 13. The illustrated arrangement employs a vibration-inducing device or shaker 62 and a laser vibrometer 60 for measuring the resulting vibration pattern, which depends on the integrity of the structure being analyzed. The vibration inducing device 62 induces a broadband frequency vibration in the structure. Different construction and conditions of the structure respond differently to the induced vibration, causing reflections between areas of different impedance and resulting in a unique vibration pattern. The vibration patterns can then be easily picked up by the laser vibrometer 60 and analyzed according to the principles set forth and herein specifically incorporated U.S. Pat. No. 6,081,481.

Another aspect of the preferred embodiment of the invention is the use of acoustic stimuli to change the behavior of termites. This aspect of the invention essentially involves exposing termites to various sounds and determining the reaction of the termites to the sounds under various conditions. For example, certain sounds cause termites to feed, and others appears to function as a warning signal which causes the termites to stop feeding.

The acoustic behavior modification aspect of the preferred embodiment is based on discoveries relating to the manner in which termites recognize and react to sounds, and in particular their ability to sense subtle vibrations in a structure by means of the sensory hairs that are found all over the body parts of termites. These sensory hairs vary in size from a few microns up to hundreds of microns. Because these sensory hairs on the legs are directly associated with the nervous system, when the sensory hairs on the termite's legs come in contact with a substrate surface, the termite is capable of picking up and responding to very minute substrate vibrations.

Preliminary tests have shown that when a termite was secured to a very small and light weight fixture with two micro electrodes, one inserted into the nervous system right next to the base of one of the six legs, and the other inserted into another part of the body, the two micro electrodes formed a closed electrical circuit, and that when acoustical vibrations were introduced to the termite, certain physical and nervous responses were invoked. The nervous responses were in the form of electrical signals, which were clearly picked up by the micro electrodes, while the physical responses were displayed through the aid of a microscope and CCD video camera.

Armed with this understanding of acoustic responses, the skilled artisan can, in principle, use the acoustic signals to alter the termite's behavior, creating a nonchemical acoustical barrier to keep termites out of a building, make chemical bait more attractive to termites, or possibly even trigger a self-destruct process in the termite colonies.

This method to disturb insect infestation behavior can be adapted by one skilled in the art to apply to fire ants, carpenter ants, carpenter bees, and wood boring beetles.

More specifically, a structural borne acoustic vibration is produced by a vibration inducing device 62. The characteristics (frequency and amplitude) of the vibration are dependent on the type of structure and the location of the insect. In the preferred embodiment the vibration is a pattern of vibrations which can be modulated. This structural borne acoustic vibration has been shown in laboratory experiments to disturb insect infestation behavior. In particular, the structural borne acoustic vibration has a frequency of between 100 Hz to 4000 Hz and an amplitude as low as $2\times10^{-8}$ displacement and has been shown to disturb the infestation behavior of termites and fire ants.

Figure 9:
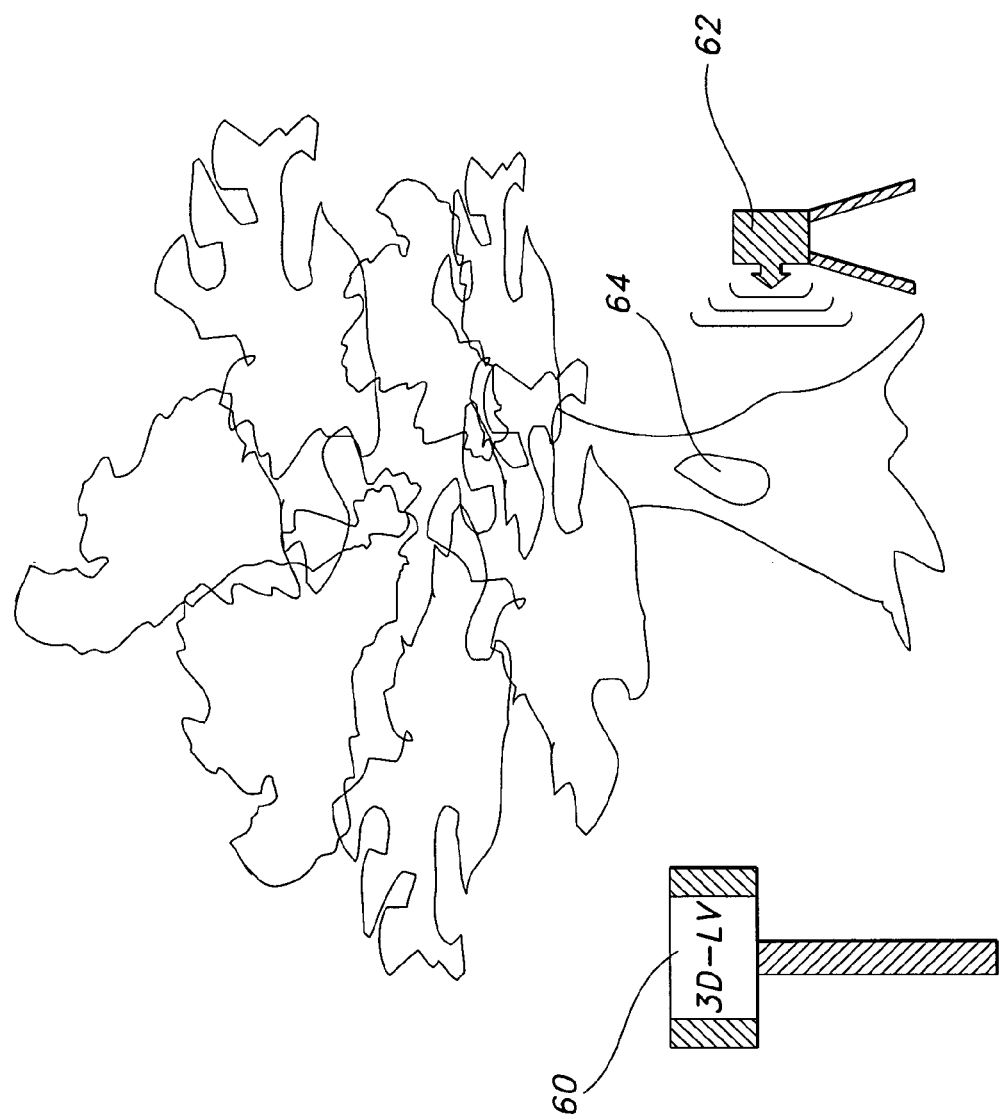
FIG. 9 is a schematic illustration of the termite damage in tree and detection/evaluation using LDV.

Now referring to FIG. 9, a vibration inducing means 62 such as a hammer or a shaker, is used to induce vibration in a tree. A laser doppler vibrometer 60 is used to detect changes in the vibration pattern reflected by a structure such as a tree. If a tree is damaged by wood destroying insects, the vibration pattern differs from an undamaged tree.

Although the foregoing invention has been described in some detail by way of illustration and example for purposes of clarity of understanding, it will be obvious that certain changes and modifications can be made which are within the full scope of the invention.

I claim:

1. A method to detect wood destroying insect infestation sites in a structure comprising:
   (a) performing a thermal scan of said structure to identify potential infestation sites;
   (b) positioning acoustic sensors at said potential infestation sites to detect vibration signals between 100 hertz and 15 kilohertz;
   (c) transmitting detected vibration signals to a computing device for comparing said detected vibration signals with control signals; and
   (d) detecting wood destroying insect infestation if detected signals are substantially similar to said control signals.

2. The method of claim 1 further comprising the steps if:
   (a) applying heat to said structure prior to performing a thermal scan; and
   (b) detecting temperature differences.

3. The method of claim 1 further comprising the steps of:
   (a) applying cold to said structure prior to performing a thermal scan; and
   (b) detecting a temperature difference.

4. The method of claim 1 wherein comparing said detected vibration signals is conducted by a computing device selected from the group consisting of a centrally located computing device and a portable computing device, operably connected with a database library of wood destroying insect sounds.

5. The method of claim 1 wherein comparing said detected vibration signals with control signals involve acoustic pattern recognition.

6. The method of claim 1 wherein in said sensors are continuously monitored for termite infestation.

7. The method of claim 1 wherein said thermal scan involves an infrared camera.

8. The method of claim 1 wherein said thermal scan further includes comparing the thermal scan with frequency spectra of a referenced image.

9. The method of claim 1 wherein said detection vibration signals are between 0.5 and three milliseconds in length.

10. A system to detect wood destroying insect infestation sites in a structure comprising:
    (a) means to perform a thermal scan of a structure to locate potential infestation sites;
    (b) means to acoustically detect termite activity sounds at potential infestation sites;
    (c) means to compare detected termite activity sounds, with a library of prerecorded termite activity sounds; and
    (d) means to determine if detected termite activity sounds are substantially similar to prerecorded termite activity sounds.

11. The system of claim 10 further including:
    (a) means to apply heat to said structure; and
    (b) means to detect a temperature change.

12. The system of claim 10 further including:
    (a) means to apply cold to said structure; and
    (b) means to detect a temperature change.

13. The system of claim 10 wherein the means to perform a thermal scan is a thermal imaging camera which further includes wood destroying insect infestation filtering software.

* * * * *